United States Patent
Yagi et al.

(10) Patent No.: US 9,822,943 B2
(45) Date of Patent: Nov. 21, 2017

(54) LAMP UNIT

(71) Applicant: KOITO MANUFACTURING CO., LTD., Tokyo (JP)

(72) Inventors: Takayuki Yagi, Shizuoka (JP); Misako Nakazawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/958,356

(22) Filed: Dec. 3, 2015

(65) Prior Publication Data
US 2016/0161074 A1    Jun. 9, 2016

(30) Foreign Application Priority Data
Dec. 3, 2014 (JP) ................................. 2014-245291

(51) Int. Cl.
*F21S 8/00* (2006.01)
*F21S 8/10* (2006.01)
*B64D 45/00* (2006.01)

(52) U.S. Cl.
CPC .......... *F21S 48/1388* (2013.01); *B64D 45/00* (2013.01); *F21S 48/1154* (2013.01); *F21S 48/1757* (2013.01)

(58) Field of Classification Search
CPC ............... F21S 48/1388; F21S 48/1154; F21S 48/1757; B64D 45/00
USPC ........................................................ 362/277
See application file for complete search history.

(56) References Cited

U.S. PATENT DOCUMENTS

| | | | |
|---|---|---|---|
| 5,938,319 A | 8/1999 | Hege | |
| 2002/0196636 A1 | 12/2002 | Dassanayake et al. | |
| 2008/0198372 A1 | 8/2008 | Pan | |
| 2014/0340909 A1* | 11/2014 | Yagi ................. | F21S 48/13 362/297 |

FOREIGN PATENT DOCUMENTS

| | | |
|---|---|---|
| CN | 104141925 A | 11/2014 |
| DE | 19530008 B4 | 2/2005 |
| JP | 9-104288 A | 4/1997 |
| JP | 2004210127 A | 7/2004 |

OTHER PUBLICATIONS

Office Action issued in corresponding Chinese Application No. 201510881983.9, dated Aug. 25, 2017 (16 pages).

* cited by examiner

*Primary Examiner* — Elmito Breval
*Assistant Examiner* — Jessica M Apenteng
(74) *Attorney, Agent, or Firm* — Osha Liang LLP (57) ABSTRACT

A light deflecting device selectively reflects an incident light to a projection optical system. An irradiation optical system irradiates light to a reflective part of the light deflecting device. The light deflecting device has at least some region in the reflective part, a position of which is switchable between a first reflection position where the light irradiated by the irradiation optical system is reflected toward the projection optical system so as to be effectively used as a portion of a desired light distribution pattern, and a second reflection position where the light irradiated by the irradiation optical system is reflected so as not to be effectively used. The irradiation optical system is disposed at a position shifted to a side which a front face of the reflective part in the first reflection position faces, with reference to a vertical plane including an optical axis of the projection optical system.

7 Claims, 8 Drawing Sheets

LAMP UNIT

CROSS-REFERENCE TO RELATED APPLICATION

The present application claims priority from Japanese Patent Application No. 2014-245291 filed on Dec. 3, 2014, the entire content of which is incorporated herein by reference.

BACKGROUND

Technical Field

The present invention relates to a lamp unit.

Related Art

In the related art, there has been proposed a vehicle illumination device in which a reflection device where a plurality of reflective elements arranged in a matrix form is provided on a front surface selectively reflects the light emitted from a light source to irradiate the front of the vehicle in a predetermined light distribution pattern (Patent Documents 1 and 2). The reflection device is configured so that the plurality of reflective elements is tiltably arranged, respectively, and the position of the plurality of the reflective elements can be switched between a first position and a second position. Further, the reflection device is configured so that the position of each reflective element is properly changed between the first position where the reflection direction of light from the light source contributes to the formation of a light distribution pattern and the second position where the reflection direction of light from the light source does not contribute to the formation of a light distribution pattern, thereby forming a light distribution pattern for illuminating a road surface or the like.

Patent Document 1: Japanese Patent Laid-Open Publication No. Hei 9-104288

Patent Document 2: Japanese Patent Laid-Open Publication No. 2004-210127

However, the above-described reflective element is tiltably switched about a pivot axis between the first position and the second position. Therefore, a desired light quantity or light distribution pattern cannot be often obtained when the direction or the position of each component of an optical system is not considered according to the direction of the pivot axis of the reflective element or the arrangement of the reflection device.

SUMMARY

Exemplary embodiments of the invention provide a lamp unit capable of achieving a desired light distribution.

A lamp unit according to an exemplary embodiment, comprises:

a projection optical system;

a light deflecting device having a reflective part, the light deflecting device being disposed on an optical axis of the projection optical system and configured to selectively reflect an incident light to the projection optical system; and an irradiation optical system configured to irradiate light to the reflective part of the light deflecting device, wherein the light deflecting device has at least some region in the reflective part, a position of which is switchable between a first reflection position where the light irradiated by the irradiation optical system is reflected toward the projection optical system so as to be effectively used as a portion of a desired light distribution pattern, and a second reflection position where the light irradiated by the irradiation optical system is reflected so as not to be effectively used, and wherein the irradiation optical system is disposed at a position shifted to a side which a front face of the reflective part in the first reflection position faces, with reference to a vertical plane including the optical axis of the projection optical system.

According to this aspect, the irradiation optical system is disposed so as to irradiate the reflective part of the light deflection device from the position shifted to the side which the front face of the reflective part in the first reflection position faces, rather than the side of the front face of the reflective part in the second reflection position. Therefore, the incidence angle or reflection angle of light of the irradiation optical system in the first reflection position becomes smaller than the incident angle or reflection angle of light of the irradiation optical system in the second reflection position. Further, since the incidence angle and the reflection angle are small, the reflected light, which is not incident on the projection optical system, is reduced. Namely, the light of the irradiation optical system can be utilized without being wasted. Meanwhile, the desired light distribution pattern includes a high-beam light distribution pattern by a vehicle headlamp, for example. Further, the case where the light irradiated by the irradiation optical system is not effectively utilized as a portion of the desired light distribution pattern may include not only the case where the reflected light of the irradiated light does not contribute at all to the formation of the light distribution pattern, but also the case where the reflected light is included to the extent that the reflected light partially contributes to the formation of the light distribution pattern but does not affect the function of the light distribution pattern.

The light deflecting device may comprise a micro-mirror array having a plurality of mirror elements, each mirror element having a reflective surface. A position of each mirror element may be switchable between the first reflection position and the second reflection position about a pivot axis, and, the pivot axis may be extended along a diagonal line of the reflective surface of the mirror element. In this way, it is possible to quickly and precisely form a light distribution pattern of various shapes The irradiation optical system may be disposed at a place rotated about the optical axis in a range of 5° to 45° to a side closer to the front face of the reflective part in the first reflection position, with reference to the vertical plane including the optical axis of the projection optical system. In this way, the compactness of the overall layout of the lamp and the amount of reflected light incident on the projection optical system can be compatible at a high level.

The irradiation optical system may comprise a reflector configured to reflect the light emitted from a light source to the light deflecting device, and the reflector may be configured to focus the reflected light on the reflective part of the light deflecting device. In this way, the light emitted from the light source can be directed to the reflective part of the light deflecting device without being wasted.

The reflective surface of the reflector may have a larger area than that of the reflective part of the light deflecting device. In this way, it is possible to reduce the size of the light deflecting device.

The irradiation optical system may further comprise the light source comprising a semiconductor light emitting element; and a compound parabolic type light-concentrating member configured to concentrate the light emitted from the light source. In this way, the light emitted from the light source can be directed to the reflective part of the light deflecting device without being wasted.

Meanwhile, any combinations of the above components and the inventions represented in the method, the device, the system, etc., are effectively practiced as an aspect of the present invention.

According to the present invention, it is possible to provide a lamp unit capable of achieving a desired light distribution.

DETAILED DESCRIPTION

Hereinafter, a preferred embodiment of the present invention will be described with reference to the drawings. The same or similar elements, members and process shown in each of the drawings are denoted by the same or similar reference numerals and a duplicated description thereof will be omitted, as appropriate. Further, the embodiment is illustrative and not intended to limit the present invention. It should be noted that all the features and their combinations described in the embodiment are not necessarily considered as an essential part of the present invention.

[Lamp Unit]

Figure 1:
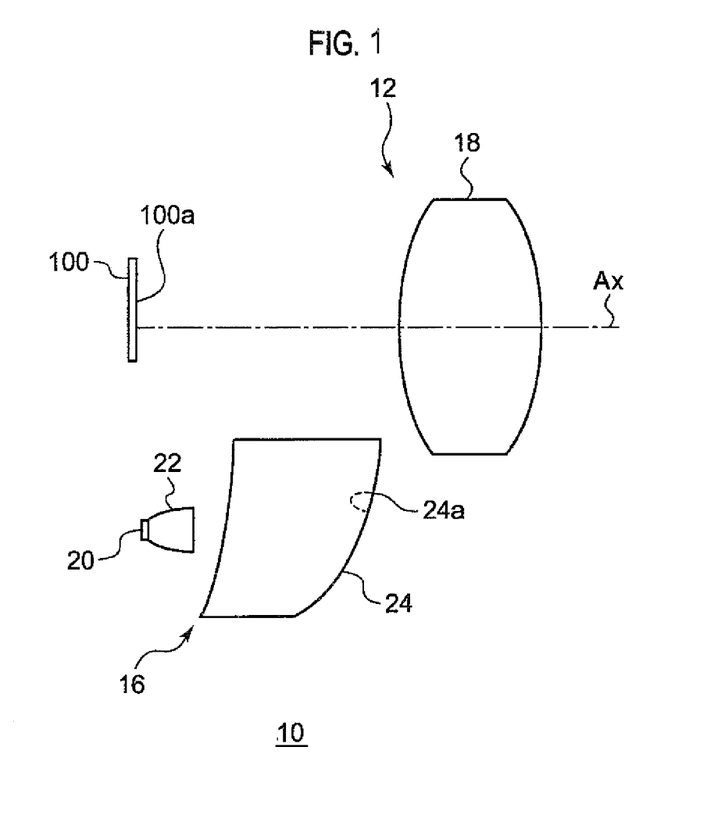
FIG. 1 is a side view schematically showing a schematic structure of a lamp unit according to the present embodiment.

FIG. 1 is a side view schematically showing a schematic structure of a lamp unit according to the present embodiment. A lamp unit 10 according to the present embodiment includes a projection optical system 12, a light deflecting device 100 disposed on an optical axis Ax of the projection optical system 12 and configured to selectively reflect the incident light to the projection optical system 12, and an irradiation optical system 16 configured to irradiate light to a reflective part 100*a* of the light deflecting device 100. The projection optical system 12 includes a projection lens 18. The irradiation optical system 16 includes a light source 20, a light-concentrating member 22, and a reflector 24. The lamp unit 10 according to the present embodiment is mainly used in a vehicle lamp (e.g., a vehicle headlamp). However, the usage of the present invention is not limited thereto, but the present invention can be also applied to lamps of various illumination devices and various moving objects (airplanes or railway vehicles, etc.).

As the light source 20, a semiconductor light emitting element such as LED (Light emitting diode), LD (Laser diode), EL (Electro luminescence) element, a bulb, an incandescent lamp (halogen lamp), and a discharge lamp or the like can be used. The light-concentrating member 22 is configured to direct much of the light emitted from the light source 20 to a reflective surface 24*a* of the reflector 24. As the light-concentrating member 22, a convex lens, a bullet-shaped solid light guide, or a reflecting mirror whose inner surface is formed as a predetermined reflective surface, or the like, can be used, for example. More specifically, a compound parabolic concentrator can be used. Meanwhile, the light-concentrating member can be omitted when most of the light emitted from the light source 20 can be directed to the reflective surface 24*a* of the reflector 24. For example, the light source 20 is mounted at a desired position of a heat sink made of metal, ceramic, or the like.

The light deflecting device 100 is disposed on the optical axis Ax of the projection optical system 12 and configured to selectively reflect the light emitted from the light source 20 to the projection optical system 12. For example, the light deflecting device 100 can include MEMS (Micro Electro Mechanical System) or DMD (Digital Mirror Device) where a plurality of micro-mirrors is arranged in an array (matrix) form. By separately controlling the angle of the reflective surfaces of these micro-mirrors, the reflection direction of the light emitted from the light source 20 can be selectively changed. Namely, some of the light emitted from the light source 20 is reflected toward the projection optical system 12 and the other light can be reflected in a direction in which the light is not effectively utilized. Here, the direction in which the light is not effectively utilized can be regarded as a direction in which the influence of the reflected light is small (e.g., the reflected light does not almost contribute to the formation of the desired light distribution pattern) or a direction in which the light is directed to a light-absorbing member (light shielding member), for example.

The micro-mirror array (to be described) of the light deflecting device 100 is arranged in the vicinity of a focal point of the projection lens 18. The projection optical system 12 may include a plurality of optical members such as lens. Further, the optical member included in the projection optical system is not limited to the lens, but may be a reflective member.

The irradiation optical system 16 according to the present embodiment includes the reflector 24 for reflecting the light emitted from the light source 20 toward the light deflecting device 100. The reflector 24 is configured so that the reflected light is focused on the reflective part 100*a* of the light deflecting device 100. In this way, the light emitted from the light source 20 can be directed to the reflective part 100*a* of the light deflecting device 100 without being wasted.

Further, the reflective surface 24*a* of the reflector 24 has a larger area than that of the reflective part 100*a* of the light deflecting device 100. Thereby, it is possible to reduce the size of the light deflecting device 100. Further, the irradiation optical system 16 according to the present embodiment includes the light source 20 having a semiconductor light emitting element, and the compound parabolic type light-concentrating member 22 configured to concentrate the light emitted from the light source 20. In this way, the light emitted from the light source 20 can be directed to the reflective part 100a of the light deflecting device 100 without being wasted.

The lamp unit 10 configured as described above can be used in a variable light distribution headlamp for implementing a partial turn on/off.

[Light Deflecting Device]

Figure 2A:
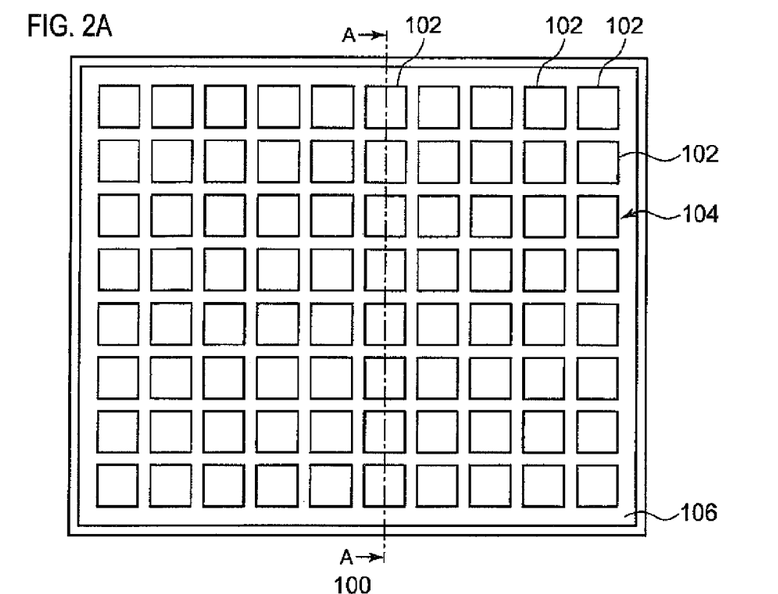
FIG. 2A is a front view showing a schematic configuration of a light deflecting device according to a reference example.
Figure 2B:
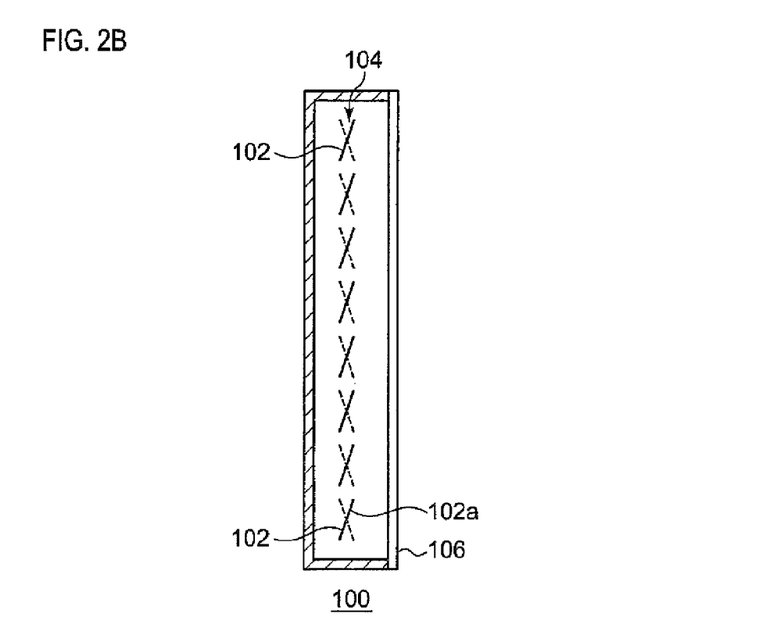
FIG. 2B is a sectional view of the light deflecting device shown in FIG. 2A, taken along a line A-A.

FIG. 2A is a front view showing a schematic configuration of a light deflecting device according to a reference example, and FIG. 2B is a sectional view of the light deflecting device shown in FIG. 2A, taken along a line A-A.

As shown in FIG. 2A, the light deflecting device 100 according to the reference example includes a micro-mirror array 104 where a plurality of micro-mirror elements 102 is arranged in a matrix form, and a transparent cover member 106 disposed on the front side (on the right side of the light deflecting device 100 shown in FIG. 2B) of reflective surfaces 102a of the mirror elements 102. The cover member is made of, for example, glass or plastic or the like.

Each mirror element 102 of the micro-mirror array 104 is configured so that a first reflection position P1 (a solid-line position shown in FIG. 2B) where the light emitted from the light source is reflected toward the projection optical system so as to be effectively used as a portion of a desired light distribution pattern, and a second reflection position P2 (a dotted-line position shown in FIG. 2B) where the light emitted from the light source is reflected so as not to be effectively used can be switched.

Figure 3:
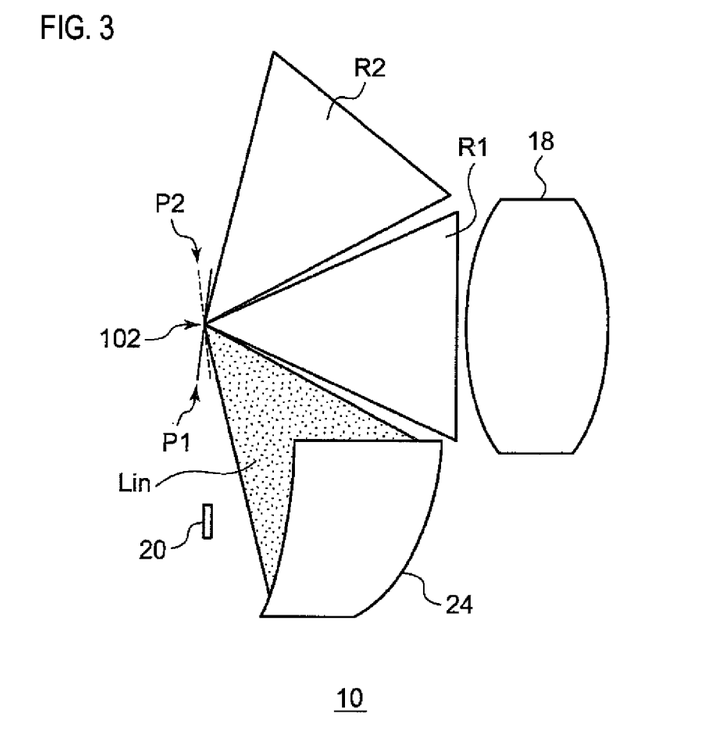
FIG. 3 is a side view schematically showing the spread of reflected light when the light emitted from a light source is reflected at a first reflection position and a second reflection position by a mirror element.

FIG. 3 is a view schematically showing the spread of reflected light when the light emitted from the light source is reflected at the first reflection position and the second reflection position by the mirror elements. Meanwhile, in FIG. 3, the micro-mirror array is shown by being replaced with a single mirror element in order to simplify the explanation. Further, the light-concentrating member 22 shown in FIG. 1 is not shown in FIG. 3.

As shown in FIG. 3, since the light emitted from the light source 20 is concentrated and reflected by the reflector 24, an incident light $L_{in}$ does not become a complete parallel light. Namely, the incident light $L_{in}$ has an incidence angle to be spread to some extent when being incident on the reflective surfaces 102a of the mirror elements 102. Further, the mirror elements 102 are arranged so that reflected light R1 is mainly directed to the projection lens 18 when the incident light $L_{in}$ is reflected at the first reflection position P1. Further, as shown in FIG. 3, the mirror elements 102 are arranged so that reflected light R2 is not directed to the projection lens 18 when the incident light $L_{in}$ is reflected at the second reflection position P2.

Further, the reflection position of each mirror element 102 is controlled, and hence, the reflection direction of the light emitted from the light source 20 is selectively changed. In this way, it is possible to obtain a desired projection image, reflection image or light distribution pattern. Specifically, the light deflecting device 100 according to the present embodiment is configured so that, in at least some mirror elements 102 of the reflective part 100a, the first reflection position P1 where the light irradiated by the irradiation optical system 16 is reflected toward the projection optical system 12 so as to be effectively used as a portion of a desired light distribution pattern, and the second reflection position P2 where the light irradiated by the irradiation optical system 16 is reflected so as not to be effectively used can be switched.

Figure 4:
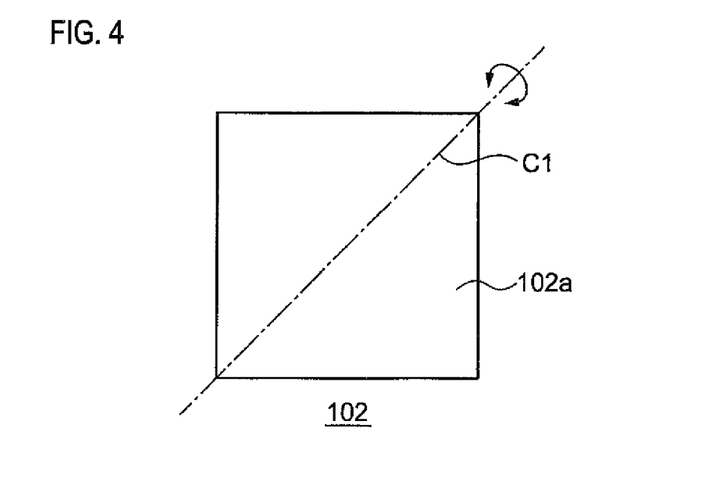
FIG. 4 is a schematic view for explaining a pivot axis of a mirror element according to the present embodiment.

FIG. 4 is a schematic view for explaining a pivot axis of the mirror element 102 according to the present embodiment. The mirror element 102 has a quadrangular (e.g., square, rhombic, rectangular, and parallelogrammic) reflective surface 102a. Each mirror element 102 is configured so that the first reflection position P1 and the second reflection position P2 can be switched about a pivot axis C1 along a diagonal line of the quadrangular reflective surface 102a. In this way, it is possible to quickly and precisely form a light distribution pattern of various shapes.

However, when the pivot axis C1 of the mirror element 102 is extended along the diagonal line of the quadrangular reflective surface and the light deflecting device 100 where such mirror elements 102 are arranged in a matrix form is used, the following phenomenon can occur.

Figure 5:
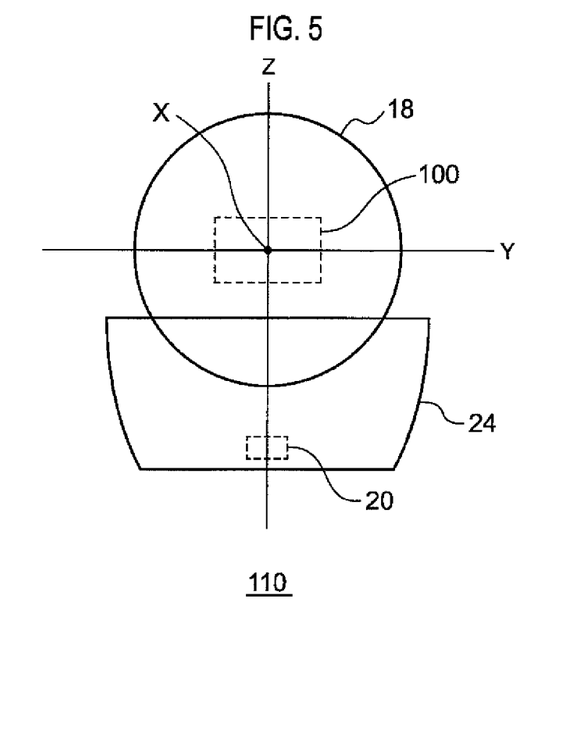
FIG. 5 is a front view showing a schematic configuration of a lamp unit according to a comparative example.
Figure 6:
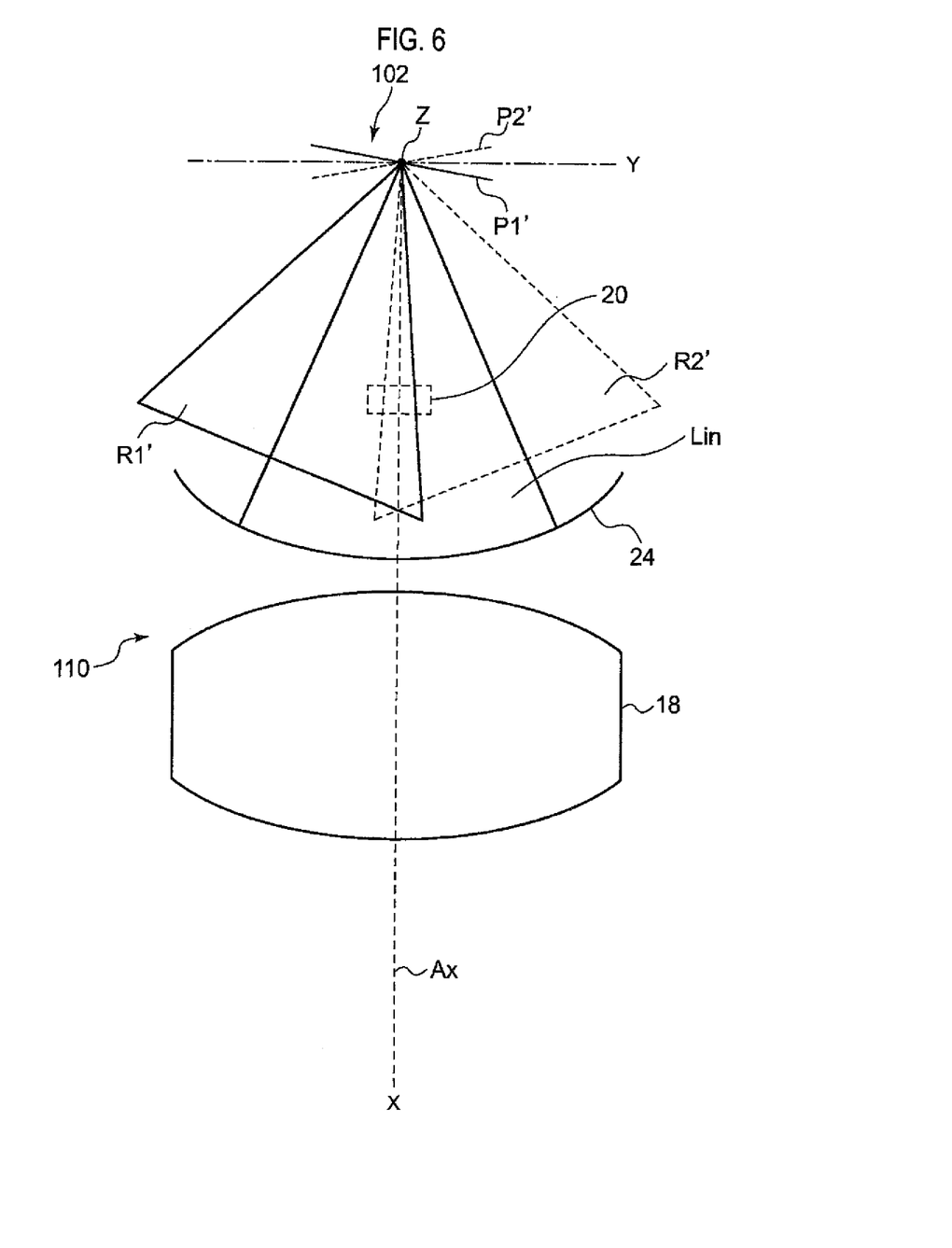
FIG. 6 is a top view schematically showing the spread of reflected light in the lamp unit shown in FIG. 5.

FIG. 5 is a front view showing a schematic configuration of a lamp unit 110 according to a comparative example. Meanwhile, the light deflecting device 100 is disposed so that two adjacent sides of each mirror element 102 are extended along Z direction (vertical direction) and Y direction (horizontal direction). FIG. 6 is a top view schematically showing the spread of reflected light in the lamp unit shown in FIG. 5. Meanwhile, for convenience of explanation, FIG. 6 shows the spread of reflected light in one mirror element.

As shown in FIG. 6, the lamp unit 110 according to the comparative example is disposed so that the light source 20 or the reflector 24 is plane-symmetric about XZ plane. That is, the light, which is emitted from the light source 20 and spread, is focused toward the optical axis Ax by the reflector 24. Therefore, in the case where the light deflecting device 100 is disposed so that a direction in which the front face of the light deflecting device 100 faces matches the optical axis Ax, the mirror element 102 is configured so that most of reflected light R1' are directed to the right region of the projection lens 18 shown in FIG. 6 when the incident light $L_{in}$ is reflected at a reflection position P1'. On the other hand, the mirror element 102 is configured so that most of reflected light R2' are directed to the left region of the projection lens 18 shown in FIG. 6 when the incident light $L_{in}$ is reflected at a reflection position P2'. In this case, the mirror element 102 is configured so that the reflected light is incident on the projection lens at both the reflection position P1' and the reflection position P2'. Therefore, it is not possible to obtain a desired light distribution pattern (irradiation pattern).

For this reason, in the lamp unit 110, it is necessary to set, as the reference position, a position to which the whole of the mirror elements 102 (the light deflecting device 100) is rotated (in a clockwise direction shown in FIG. 6) by approximately 10° to 15° about Z axis, for example. By doing so, most of the reflected light R1' are incident on the projection lens 18 and most of the reflected light R2' are not incident on the projection lens 18. However, on the other hand, the light emitted from the light source 20 is, as a rectangular light source image, obliquely incident on and reflected from the mirror elements 102 in the reflection position P1'. Therefore, the light source image is rotated and projected to the front by the projection lens 18.

Figure 7:
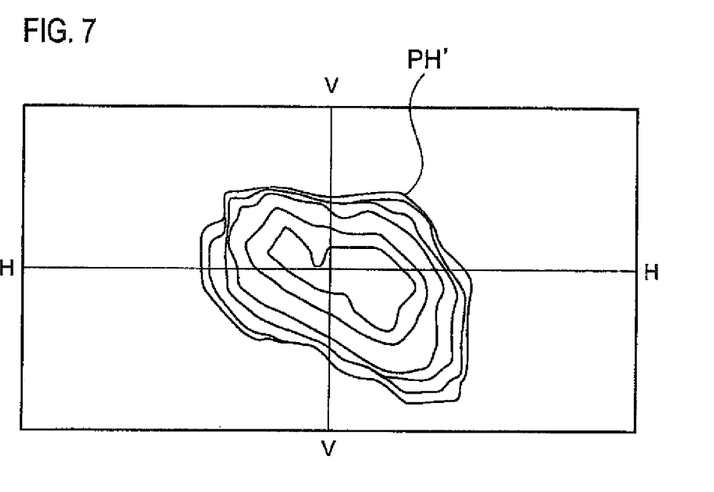
FIG. 7 is a schematic view showing an example of an irradiation pattern by the lamp unit according to the comparative example.

FIG. 7 is a schematic view showing an example of an irradiation pattern by the lamp unit 110 according to the comparative example. As shown in FIG. 7, an irradiation pattern PH' is obliquely tilted as a whole. Thus, a desired light distribution pattern cannot be obtained. Therefore, the present inventors have intensively studied and have found that the above problems can be solved by shifting the position of the irradiation optical system 16 from a vertical plane including the optical axis Ax.

Figure 8:
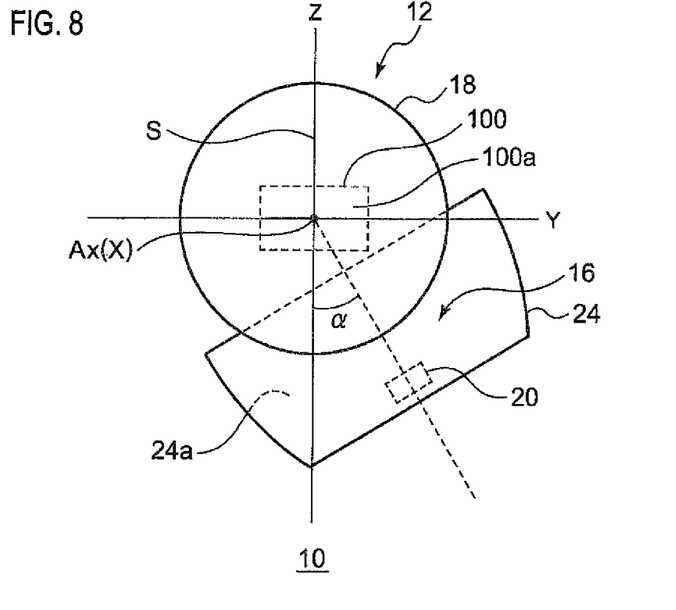
FIG. 8 is a front view showing a schematic configuration of the lamp unit according to the present embodiment.
Figure 9:
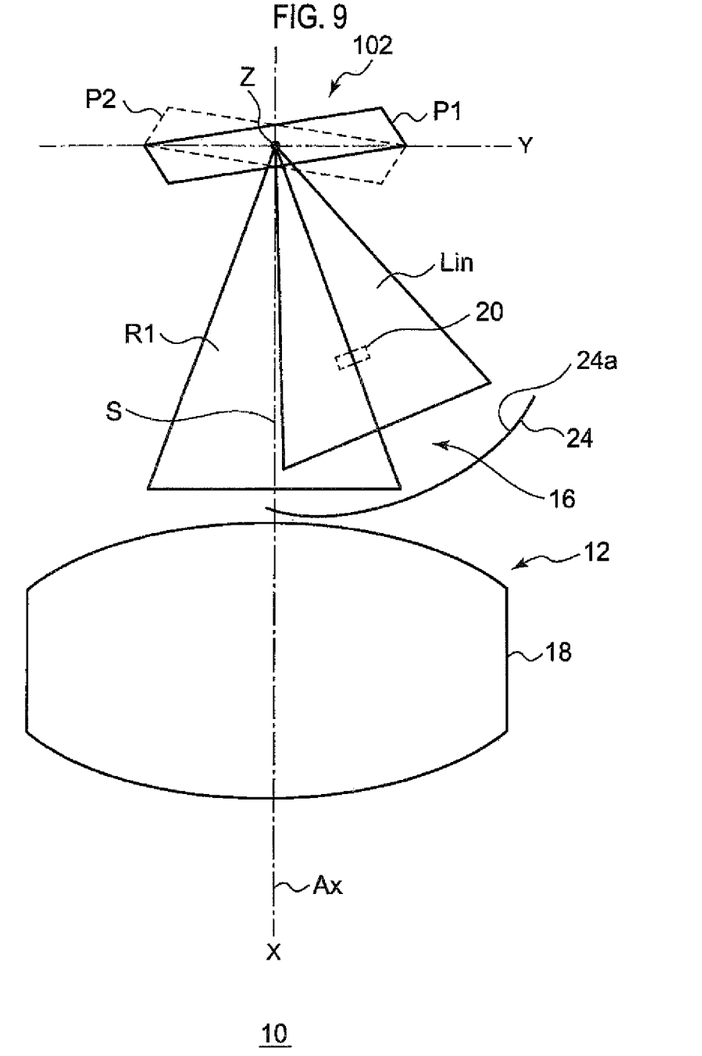
FIG. 9 is a top view schematically showing the spread of reflected light in the lamp unit shown in FIG. 8.
Figure 10:
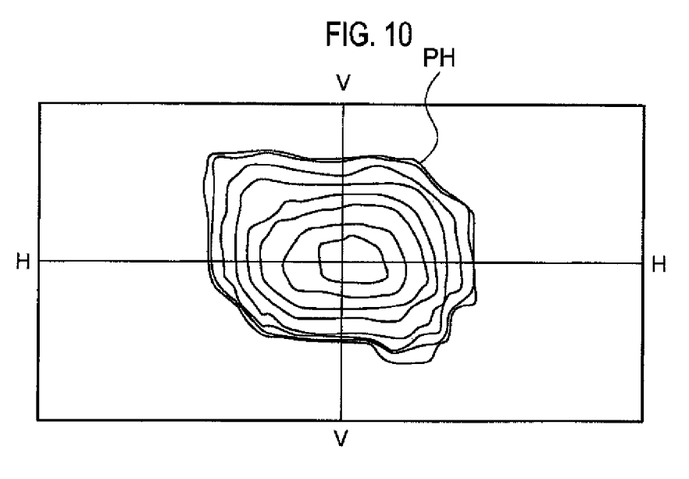
FIG. 10 is a schematic view showing an example of an irradiation pattern by the lamp unit according to the present embodiment.

FIG. 8 is a front view showing a schematic configuration of the lamp unit 10 according to the present embodiment. FIG. 9 is a top view schematically showing the spread of reflected light in the lamp unit 10 shown in FIG. 8. FIG. 10 is a schematic view showing an example of the irradiation pattern by the lamp unit 10 according to the present embodiment.

As shown in FIG. 8 or FIG. 9, the irradiation optical system 16 according to the present embodiment is disposed so as to irradiate the mirror elements 102 in the reflective part of the light deflecting device 100 from the position shifted to the side which the front face of the mirror element 102 in the first reflection position P1 faces (the right side of the optical axis Ax shown in FIG. 9), with reference to a vertical plane S (XZ plane) including the optical axis Ax of the projection optical system 12.

The irradiation optical system 16 of the lamp unit 10 thus configured is disposed so as to irradiate the reflective part 100a of the light deflection device 100 from the position shifted to the side which the front face of the reflective part 100a in the first reflection position P1 faces, rather than the side which the front face of the reflective part 100a in the second reflection position P2 faces. Therefore, the incidence angle or reflection angle of light of the irradiation optical system 16 in the first reflection position P1 becomes smaller than the incident angle or reflection angle of light of the irradiation optical system in the second reflection position P2. As a result, the layout of the irradiation optical system 16 and the projection optical system 12 can be made to be compact. Further, since the incidence angle and reflection angle with respect to the mirror elements 102 located in the first reflection position P1 are small, the reflected light, which is not incident on the projection optical system 12, is reduced. Namely, the light of the irradiation optical system 16 can be utilized in the light distribution pattern without being wasted.

The irradiation optical system 16 is disposed at a place rotated about the optical axis Ax in an angle of $\alpha°$ ($0<\alpha\leq 45$) to the side closer to the front face of the reflective part 100a of the light deflecting device 100 in the first reflection position P1, with reference to the vertical plane S including the optical axis Ax of the projection optical system 12. Meanwhile, although the rotation angle α can be variously changed in accordance with the setting of a pivot angle (angle displacement between the first reflection position and the second reflection position about the pivot axis C1 as a rotation center) of the mirror element 102, the rotation angle is preferably 5° or more, and also, is preferably 40° or less.

As shown in FIG. 10, the lamp unit 10 thus configured can obtain the irradiation pattern PH close to the rectangle. Specifically, the whole irradiation optical system 16 is rotated while assuming that a light source image is rotated when being reflected by the light deflecting device 100. Thus, it is easy to achieve a desired light distribution pattern. Further, the whole structure is rotated while maintaining a relative arrangement relationship between the light source 20 and the reflector 24. In this way, the reflected image reaches the light deflecting device 100 without being changed when the light source image is reflected by the reflector 24. Therefore, the optical design becomes easy. Thereby, the compactness of the overall layout of the lamp and the amount of reflected light incident on the projection optical system 12 can be compatible at a high level, while obtaining a desired light distribution pattern.

Hereinabove, the present invention has been described with reference to each illustrative embodiment described above. However, the present invention is not limited to these illustrative embodiments. A suitable combination or substitution for the configuration of each illustrative embodiment is also intended to be included in the present invention.

Further, based on the knowledge of those skilled in the art, the combination or the order of processing in each illustrative embodiment can be appropriately changed or a modification such as various design changes can be added to each illustrative embodiment. An illustrative embodiment to which such modification is added can be also included to the scope of the present invention.

What is claimed is:

1. A lamp unit comprising:
   a projection optical system;
   a light deflecting device having a reflective part, the light deflecting device being disposed on an optical axis of the projection optical system and configured to selectively reflect an incident light to the projection optical system; and
   an irradiation optical system configured to irradiate light to the reflective part of the light deflecting device,
   wherein the light deflecting device has at least some region in the reflective part, a position of which is switchable between a first reflection position where the light irradiated by the irradiation optical system is reflected toward the projection optical system so as to be effectively used as a portion of a desired light distribution pattern, and a second reflection position where the light irradiated by the irradiation optical system is reflected so as not to be effectively used,
   wherein, in the first reflection position, a front face of the reflective part faces a direction towards one side of a vertical plane including the optical axis of the projection optical system, and
   wherein the irradiation optical system is disposed at a position such that a center line of the irradiation optical system directed towards the light deflecting device forms an angle with the vertical plane, the angle being towards the one side of the vertical plane.

2. The lamp unit according to claim 1, wherein the light deflecting device comprises a micro-mirror array having a plurality of mirror elements, each mirror element having a reflective surface,
   wherein a position of each mirror element is switchable between the first reflection position and the second reflection position about a pivot axis, and
   wherein the pivot axis is extended along a diagonal line of the reflective surface of the mirror element.

3. The lamp unit according to claim 1, wherein the irradiation optical system is disposed such that the angle between the center line and the vertical plane is in a range of 5° to 45°.

4. The lamp unit according to claim 1, wherein the irradiation optical system comprises a reflector configured to reflect the light emitted from a light source to the light deflecting device, and
   wherein the reflector is configured to focus the reflected light on the reflective part of the light deflecting device.

5. The lamp unit according to claim 4, wherein the reflective surface of the reflector has a larger area than that of the reflective part of the light deflecting device.

6. The lamp unit according to claim 4, wherein the irradiation optical system further comprises
   the light source comprising a semiconductor light emitting element; and
   a compound parabolic type light-concentrating member configured to concentrate the light emitted from the light source.

7. A lamp unit comprising:
   a projection optical system;

a light deflecting device having a reflective part, the light deflecting device being disposed on an optical axis of the projection optical system and configured to selectively reflect an incident light to the projection optical system; and an irradiation optical system comprising a light source and configured to irradiate light to the reflective part of the light deflecting device, wherein the light deflecting device has at least some region in the reflective part, a position of which is switchable between a first reflection position where the light irradiated by the irradiation optical system is reflected toward the projection optical system so as to be effectively used as a portion of a desired light distribution pattern, and a second reflection position where the light irradiated by the irradiation optical system is reflected so as not to be effectively used, wherein, in the first reflection position, a front face of the reflective part in the first reflection position faces a direction towards one side of a vertical plane that includes the optical axis of the projection optical system, and wherein the irradiation optical system is disposed such that an entirety of the light source is disposed to the one side of the vertical plane including the optical axis of the projection optical system.

* * * * *